(12) United States Patent
Augier et al.

(10) Patent No.: US 11,319,505 B2
(45) Date of Patent: May 3, 2022

(54) ANTI-CLOGGING DEVICE FOR THE UPFLOW OF A FLUID

(71) Applicant: IFP Energies nouvelles, Rueil-Malmaison (FR)

(72) Inventors: Frederic Augier, Saint Symphorien D Ozon (FR); Frederic Bazer-Bachi, Saint Privat des Vieux (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 124 days.

(21) Appl. No.: 16/305,780

(22) PCT Filed: May 19, 2017

(86) PCT No.: PCT/EP2017/062068
§ 371 (c)(1),
(2) Date: Nov. 29, 2018

(87) PCT Pub. No.: WO2017/207294
PCT Pub. Date: Dec. 7, 2017

(65) Prior Publication Data
US 2020/0255764 A1   Aug. 13, 2020

(30) Foreign Application Priority Data
May 30, 2016   (FR) ...................... 1654862

(51) Int. Cl.
*B01J 8/04* (2006.01)
*C11B 3/10* (2006.01)
*C10G 3/00* (2006.01)
*C10G 67/06* (2006.01)
(Continued)

(52) U.S. Cl.
CPC ................. *C11B 3/10* (2013.01); *B01J 8/008* (2013.01); *B01J 8/0453* (2013.01); *B01J 8/0457* (2013.01); *C10G 3/42* (2013.01); *C10G 3/50* (2013.01); *C10G 67/06* (2013.01); *B01D 15/10* (2013.01); *B01J 8/0492* (2013.01);
(Continued)

(58) Field of Classification Search
None
See application file for complete search history.

(56) References Cited

U.S. PATENT DOCUMENTS 2,245,145 A * 6/1941 Hall ...................... B01J 8/0492
                                                           422/605
2,257,178 A * 9/1941 Martin .................. B01J 8/0453
                                                           422/605
(Continued)

FOREIGN PATENT DOCUMENTS

FR   2875715 A1   3/2006
FR   2950895 A1   4/2011
FR   3014899 A1   6/2015

OTHER PUBLICATIONS

International Search Report PCT/EP2017/062068 dated Aug. 4, 2018 (pp. 1-6).

*Primary Examiner* — Jennifer A Leung
(74) *Attorney, Agent, or Firm* — Millen, White, Zelano and Branigan, P.C.; Harry B. Shubin

(57) ABSTRACT

The invention relates to a device for the upflow of a single-phase fluid comprising at least two beds of solid particles and at least one bypass means for a portion of said fluid, and also to the use thereof.

10 Claims, 2 Drawing Sheets

(51) Int. Cl.
 *B01J 8/00* (2006.01)
 *B01D 15/10* (2006.01)
(52) U.S. Cl.
 CPC ............... *B01J 2208/00884* (2013.01); *B01J 2208/00938* (2013.01); *C10G 2300/1011* (2013.01)

(56) References Cited

U.S. PATENT DOCUMENTS

| | | | | |
|---|---|---|---|---|
| 3,509,043 | A | * | 4/1970 | McMaster ............... B01J 8/0453 208/213 |
| 3,607,000 | A | * | 9/1971 | Beal ........................ B01J 8/0453 423/659 |
| 4,298,589 | A | * | 11/1981 | LeBlanc ................. B01J 8/0005 422/148 |
| 4,470,931 | A | * | 9/1984 | Callahan ................ B01J 8/0453 422/139 |
| 5,670,116 | A | * | 9/1997 | Gupta .................... B01J 8/0453 422/111 |
| 5,939,031 | A | * | 8/1999 | Ellis ........................ B01D 3/16 261/148 |
| 7,521,027 | B2 | | 4/2009 | Boyer |
| 2009/0214410 | A1 | * | 8/2009 | Blanchard .......... B01J 20/28052 423/437.2 |
| 2014/0097125 | A1 | | 4/2014 | Bazer-Bachi |

\* cited by examiner

ANTI-CLOGGING DEVICE FOR THE UPFLOW OF A FLUID

The invention relates to the field of devices enabling the upflow of single-phase fluids through a bed of solid particles.

The invention is particularly suitable for devices in which the beds of solid particles have a tendency to become fouled, leading to differential pressures across the beds that may become unacceptable.

PRIOR ART

Within the context of the pre-treatment of vegetable oils, solutions of the type of pre-treatment on a fixed bed may be used in order to reduce the content of species that are dangerous for the hydrotreating catalysts located downstream, such as for example phospholipids (US2011138680A). Since the service life of the bed is limited by the fouling thereof, it is necessary to operate a series of beds in swing mode, in order to replace the catalyst of one bed while the pretreatment is continued with another bed.

In these pretreatment reactors, the hydrodynamics are characterized by a liquid single-phase downflow of the oil, until the moment when the differential pressure across the bed, i.e. the difference between the pressure at the inlet and at the outlet of the bed, becomes too great due to the fouling of a fraction of the bed, requiring the swing to a reactor installed in parallel. Although not necessarily cited in the patents dealing with the pre-treatment of vegetable oils, the use of swing reactors is the general rule on the industrial scale.

The fouling may be retarded by capturing the species that lead to the formation of a deposit on the catalyst beds or the beds of adsorbents. Document FR 3 014 899 teaches the linking of two steps of adsorption on particular adsorbents in order to capture in particular the fouling insoluble species. However, once the bed is fouled, it is necessary to stop the operation in order to clean the adsorbent, even though a significant proportion of adsorbent is still free of deposit.

Specifically, this fouling is not homogeneous over the entire height of the fixed bed: it is probable that the upstream part of the bed, in the flow direction, is more fouled than the downstream part. The service life of the fixed bed could therefore be increased if it were technologically possible to better use the entire height of the bed.

Patent U.S. Pat. No. 3,607,000 presents two fluid bypass solutions, either for a fraction of a fixed bed, or for the whole of the catalyst bed, with various lengths of bypass tubes. The bypass tubes are equipped with rupture discs at the inlet, optionally rated with various rupture pressures, or else, in the case of the bypass of the whole of the bed, with an external valve. However, the system proposed can only be used with a downflow.

U.S. Pat. No. 5,939,031 describes a fixed-bed reactor in which the gas and the liquid flow countercurrently. The reactor comprises a catalyst bed surmounted by a tray for distributing the liquid which flows downward and also a device for bypassing this bed in order to enable a portion of said liquid to be diverted. The bypass device is equipped with control means for regulating the amount of liquid diverted by this device. The control means of the bypass device are implemented as a function of the level of liquid in the distribution tray when the bed is fouled and the flow of liquid is achieved by a siphon effect between an upper level of liquid triggering said effect and a lower level of liquid that arrests this siphon effect, which thus makes it possible to regulate the amount of liquid diverted. While the bed is not fouled, even if the pressure difference increases, the bypass device is not triggered. This implementation has a tendency to generate large variations in the flow rate and/or in the pressure across the bed of solid particles. These variations may generate instabilities, which are more or less regular, or isolated stoppages of the flow of fluid across the bed.

Patent U.S. Pat. No. 7,521,027 presents a bypass means through which the flow is mechanically increased gradually owing to an outlet cross section of said means that is correlated to the pressure drop in the catalyst bed, the increase in flow rate being achieved by means of a mechanical part pushed by the fluid, said part being held in place by a return means. Fluid passes through the bypass means starting from a certain threshold and the flow rate thereof increases gradually by a continuous regulation of the bypass means. This document mainly addresses downflows, with a complex outlet of the bypass means that comprises a pipe that forms a U-bend. This text does not address the problem of the fouling of the bypass means.

During the implementation of a downflow, there is a risk that the fouling elements circulating with the fluid will clog the bypass pipes, even if no fluid circulates through these elements, simply by falling by gravity into said pipes. It is quite possible that the bypass means do not operate as expected owing to this clogging, by not bypassing the necessary portion of fluid when the differential pressure that must trigger this means is reached.

OBJECTIVE AND ADVANTAGE OF THE INVENTION

One subject of the invention is a device for the upflow of a single-phase fluid comprising:
- at least two beds of solid particles retained on the lower surface thereof by a means for distributing said fluid and on the upper surface thereof by a means for retaining said particles,
- each bed comprising at least one bypass means for a portion of said fluid, attached to said distribution means and to said retaining means,
- said bypass means comprising a pipe, the lower end of which opens below the lower surface of said distribution means and the upper end of which opens above said retention means,
- said pipe comprising a means for restricting the passage of the fluid actuated by the differential pressure across said bed.

One advantage of the device according to the invention compared to a device in which the flow is downwards is a gain in compactness owing to the simplification of the bypass means. In the particular case where the device according to the invention is attached to support grids of the fixed bed, the assembly obtained has great compactness and excellent mechanical strength. Finally, another advantage of the device according to the invention is the possible use thereof in an existing reactor comprising at least two beds, without it being necessary to modify the internal elements already present such as catalyst grids or support.

DETAILED DESCRIPTION OF THE INVENTION

The device according to the invention comprises at least two beds of solid particles in one and the same chamber. The number of beds may be adjusted as a function of the nature of the fouling. Thus, if the fouling has a tendency to occur at the inlet of the bed over a thin thickness, it is possible to multiply the number of beds, the beds being successively bypassed owing to the device according to the invention as they become fouled. Thus, all of the solid particles contained in the device end up being used, considerably increasing the service life of the device compared to a fixed bed which has no bypass means such as the device according to the invention.

The device according to the invention is suitable for the upflow of a single-phase fluid, particularly a fouling single-phase fluid.

A fouling single-phase fluid is understood to mean a fluid whose circulation in a bed of particles leads to the formation of a deposit in said bed, this deposit hindering the circulation of said fluid. This deposit may form both on the catalyst grains and between these grains. The gradual formation of the deposit in the bed, or fouling of the bed, leads to an increase in the differential pressure across said bed, i.e. to an increase in the difference between the pressure measured at the inlet and at the outlet of said bed in the flow direction of the fluid. This gradual formation of a deposit may also lead to a degradation of the performances of said bed making it necessary, for example, either to modify the operating temperatures, or the flow rates of fluids in order to maintain a given reaction or separation activity. Said single-phase fluid is advantageously a liquid, and very advantageously an oil comprising triglycerides and/or free fatty acids and/or esters.

Upflow has several advantages. It is for example possible to impose an occasional abrupt variation in flow rate so as to promote a defouling of the bed. The abrupt variation in flow rate has the effect of "loosening" the bed, i.e. of locally increasing it's void fraction, and of breaking the deposit in the process of being formed. This defouling makes it possible to delay the use of a bypass of the bed, provided that the bypass means is not activated during the abrupt variation in flow rate. In order to carry out the defouling by pressure surge, a small space will advantageously be made between the upper surface of the bed and the means for retaining the particles, advantageously a perforated plate or a grid, said means being placed above the upper surface of said bed. The term small is understood to mean a space whose height is at most 10% of the height of the bed, advantageously at most 5% of the height of the bed, very advantageously at most 3%, at most 2%, at most 1% of the height of the bed, said height of the space above the bed not being zero. The construction of this small space leads to a slightly smaller gain in compactness to the advantage of a greater service life of the catalyst bed. There is therefore an advantageous synergy by coupling bypass technology and operating techniques for loosening the solid.

One advantage of upflow is that the bypass means cannot be clogged by fouling elements optionally circulating with the fluid when said means is not actuated. Specifically, any element possibly entering into said means would come back out thereof by the effect of gravity.

Since the device according to the invention is used for the upflow of a single-phase fluid, it is essential that the upper part of the bypass means opens at least level with the upper surface of the bed of particles so that the outlet zone of said means cannot be fouled by the particles of said bed.

Thus, the combination of the device according to the invention and of an upflow mode prevents the bypass means from being deteriorated, clogged, or seeing its operation degraded by the deposit and/or accumulation of debris (particle fines, crystals, broken metal, chemical reaction intermediates or by-products, etc.) in the bypass means, and in particular hindering the operation of the restriction means.

Said means for restricting the passage may advantageously be a mechanical means. This means may also incorporate control components, for example electrical control components, and enable an external control of the device of the invention. This means may further comprise components for measuring the flow rate of the fluid and may be integrated into a control loop.

This means may thus comprise any control and/or regulating component known to a person skilled in the art.

Said restriction means is actuated by the differential pressure across said bed, which is also referred to as pressure drop. The pressure drop is induced by the circulation of the fluid across the solid particle bed. It gradually increases when deposits are formed in said particle bed. The restriction means may either gradually open the passage in said bypass means from the start of the increase in the pressure drop across the bed, or only be actuated starting from a certain value of this pressure drop, referred to as a threshold value. The operating mode, and also—where appropriate—this threshold value, are determined by a person skilled in the art as a function of the mechanical and operating constraints of the process in which the device according to the invention is used, such as height of the fixed beds, rate of fouling, power of the members for circulating the fluid (pumps, compressors), mechanical strength.

According to one preferred embodiment, said restriction means comprises:
  a flared tubular portion, the orifice of which that has the smallest cross section is oriented towards the upstream of the pipe of the bypass means,
  a movable part, mounted in said flared tubular portion so as to allow a displacement between a closure position and a maximum opening position, the positioning of the movable part being a function of the flow rate of fluid in said flared tubular portion, and
  a return means that acts on the movable part in order to displace it towards the closure position in which the movable part blocks the orifice of the flared tubular portion that has the smallest cross section.

The term "upstream" is defined relative to the flow direction of the fluid.

Preferably, the return means acts by the force of gravity on the movable part.

Thus, in this case, the movable part additionally has, due to its own weight and owing to the positioning of the flared portion, the function of the return means.

The return means may also comprise, or be essentially formed by, a spring.

In order to optimize the leaktightness of the restriction means in the closure position, the flared tubular portion and the movable part may take any shape that enables the movable part, in the closure position, to cooperate with the flared tubular portion in order to achieve this leaktightness. Preferably, the flared tubular portion has the shape of a conical frustum and the movable part has the shape of a ball or a conical frustum.

According to another preferred embodiment, said restriction means comprises:
  at least one plate movably mounted about an axis on the upper end of the pipe of the bypass means so as to allow a displacement between a closure position and a maximum opening position, the positioning of said plate being a function of the flow rate of fluid in the bypass means, and a return means that acts on the plate(s) in order to displace it (them) towards the closure position during which the plate(s) block(s) the end of the pipe.

In this other embodiment, the return means may comprise, preferably, a rod in the extension of the plate and a localized mass at the free end of the rod and that acts as a counterweight relative to the axis of mobility of the plate.

Said means for retaining the particles is positioned above the upper surface of said bed of particles in order to prevent the expansion of the catalyst bed under the effect of the upflow speed of the fluid. Said retention means is permeable to the fluid and impermeable to the particles. Said bypass means is attached on the one hand to said distribution means and, on the other hand, to said retention means. This method of attachment makes it possible to ensure an excellent mechanical strength of said bypass means with very good compactness, the ends of the bypass means being flush with the surfaces of the distribution means. Said retention means is advantageously a perforated plate or a grid.

In one preferred embodiment, the device according to the invention comprises at least two bypass means per bed. In this arrangement, the means for restricting the passage of said bypass means may advantageously be actuated by different differential pressures across said bed. Thus, the bypass means are actuated independently for different differential pressure values, gradually making possible to bypass increasingly large amounts of fluid as the bed is fouled.

Said bypass means makes it possible to ensure that a fraction of the fluid does not pass through the solid particle bed. Said bypass means comprises a cross section which occupies between 0.5% and 20% of the cross section of said device, advantageously between 1% and 10% of the cross section of said device, said cross section being measured perpendicular to the flow direction of the fluid. Indeed it is important that the presence of said means disturbs the general flow of the fluid through the bed as little as possible.

The invention also relates to the use of the device according to the invention for the pre-treatment of crude or semi-refined oils.

The feedstock treated in the device used according to the invention is an oil containing triglycerides and/or free fatty acids and/or esters.

Said oil comprises fouling insoluble species that are particularly detrimental to the activity and the service life of the catalysts for the conversion of oils. These species may be separated with the aid of adsorbent, the activity of which decreases rapidly owing to the fouling by said species. The use of at least one device, advantageously of the device according to the invention for treating an oil containing triglycerides and/or free fatty acids and/or esters therefore makes it possible to best use the adsorbent contained in said device.

Said oil is advantageously chosen from palm oil, soybean oil, palm kernel oil, coconut oil, babassu oil, rapeseed oil, camelina oil, sunflower oil, corn oil, cottonseed oil, peanut oil, Jatropha curcas oil, castor oil, linseed oil and sea kale oil and all oils derived for example from sunflower or rape seed by genetic modification or hybridization or else originating from algae or aquatic organisms or from oils that are partially modified for example by polymerization or oligomerization, such as for example the linseed and sunflower "stand oils" and the blown vegetable oils, and also from animal fats and preferably from lard and the fats composed of residues from the food industry or derived from restaurant industries.

The density of this oil at 15° C. is advantageously between 850 and 970 kg/m$^3$ and its kinematic viscosity at 40° C. is between 20 and 400 mm$^2$/s, and preferably between 30 and 50 mm$^2$/s.

Said oil generally comprises various impurities and in particular heteroatoms such as nitrogen, sulfur or phosphorus. The contents of nitrogen and of sulfur in the feedstock treated in the device used according to the invention are generally between 1 ppm and 100 ppm by weight approximately and preferably less than 100 ppm, depending on the nature thereof. They may reach up to 1% by weight for particular feedstocks.

In accordance with the invention, said device, supplied with said oil and producing a pretreated oil, comprises at least two fixed beds of solid particles, said particles being at least one adsorbent chosen from porous refractory oxides, clays, zeolites, activated carbons, silicon carbide, taken alone or as a mixture, optionally impregnated with one or more alkaline-earth metal phosphates.

Preferably, said adsorbent has, once formed, an outer surface of greater than $4\pi d^2/4$, d being the largest diameter characteristic of the cross section of said adsorbent, d advantageously varying between 1 and 35 mm.

Preferably, said adsorbent is free of catalytic metals chosen from groups 6 and 8 to 12.

Said porous refractory oxide is advantageously chosen from porous refractory oxides known to a person skilled in the art, and preferably from alumina, which is optionally activated, silica, titanium oxide, zirconium oxide and silica-alumina, and very preferably is a macroporous alumina.

Said porous refractory oxide is advantageously chosen from porous refractory oxides that have a macroporosity.

Said porous refractory oxide advantageously has a macroporous volume, measured by mercury intrusion, i.e. a volume in the pores with a diameter greater than 500 Å, of greater than 0.1 ml/g, and preferably of between 0.125 and 0.4 ml/g.

Said porous refractory oxide advantageously has a total pore volume of greater than 0.60 ml/g, and preferably of between 0.625 and 1.5 ml/g and a specific surface area expressed as SBET advantageously of between 30 m$^2$/g et 320 m$^2$/g.

The alkaline-earth metals are elements chosen from beryllium, magnesium, calcium, strontium, barium and radium, preferably chosen from magnesium, calcium and strontium and preferably from magnesium and calcium.

When it is impregnated, said adsorbent is advantageously impregnated with one or more alkaline-earth metal phosphates in a proportion of from 0.2% to 40% by weight, preferably from 0.2% to 30% by weight, preferably from 0.2% to 20% by weight, very preferably from 0.2% to 10% by weight and more preferably still from 0.5% to 5% by weight relative to the total weight of said adsorbent.

Preferably, the alkaline-earth metal phosphate(s) is (are) impregnated in any manner known to a person skilled in the art, either by immersion or dry impregnation and preferably the alkaline-earth metal phosphate(s) is (are) dry-impregnated on the support.

Preferably, the alkaline-earth metal phosphate(s) is (are) formed at the surface of said support of said adsorbent by impregnation of a solution containing the phosphates and the alkaline-earth metal cations or by two successive impregnations, firstly of a solution containing the phosphates and secondly of a solution containing the alkaline-earth metal cations. The order of impregnation of said solutions is unimportant. Preferably, the solution containing the phosphates is impregnated first. The impregnation(s) is (are)

advantageously carried out by immersion or dry impregnation and preferably dry impregnation. After each impregnation, said support of said impregnated adsorbent obtained of said second reactor is dried at a temperature of between 90° C. and 120° C. for 4 to 12 h then calcined in air at a temperature of between 450° C. and 550° C. for 2 to 6 h.

Preferably, said adsorbent is shaped in the form of grains of various shapes and sizes.

Preferably, said adsorbent is used in the form of a stack of separate individual particles or in the form of one or more multichannel monoliths installed in series or in parallel.

In the case where said adsorbent is in the form of a stack of separate individual particles, said adsorbent is in the form of beads or multilobed cylinders, preferably with a number of lobes of between 2 and 5 or the form of rings, hollow cylinders, hollow rings, Raschig rings, serrated hollow cylinders, crenellated hollow cylinders, cartwheels, Blend saddles or multi-hole cylinders, alone or as a mixture.

The fixed beds of said device may comprise adsorbents having one or more types of shaping. According to one preferred embodiment, only the first fixed bed of said device comprises adsorbents having one or more types of shaping, the first being understood as the first encountered by the fluid.

Preferably, the fill factor of said fixed bed, equal to the ratio of the volume filled by said adsorbent to the total volume of said bed, is less than or equal to 64%, preferably between 20% and 64%, and very preferably between 20% and 60%. The fill factor is adjusted by the method of loading said adsorbent and/or the geometric characteristics of said adsorbent.

Said adsorbent may advantageously be used alone or as a mixture. It is particularly advantageous to superimpose different adsorbents in at least two different fixed beds of variable height, the adsorbents having the greatest void fraction preferably being used in the first fixed bed(s), at the inlet of said device.

In accordance with the invention, said device is operated at a temperature of between 50° C. and 320° C., preferably between 50 and 250° C., at a pressure between 0.1 and 7 MPa, preferably between 0.3 and 1 MPa and with a residence time of said oil on each of said fixed beds of between 0.1 and 1.8 hours and preferably of between 0.1 and 0.9 hours.

According to one preferred use of the device according to the invention, at least two devices are used in parallel, and advantageously can be used in swing mode. Thus it is possible to clean or replace the fixed beds of one of the devices for cleaning purposes when the adsorbent(s) constituting these fixed beds is (are) saturated with solid impurities. The options for the cleaning phase of the saturated fixed bed are known to a person skilled in the art and are presented for example in document FR 3 014 899.

During the use of several devices according to the invention that can be used in swing mode, the swinging is advantageously carried out when the phosphorus content in the pretreated oil is greater than 2 ppm.

The device according to the invention may advantageously be used for refining food oils and dietary fatty substances.

Preferably, the device according the invention is used upstream of any process or any step for treating said oils with a view to obtaining diesel and kerosene bases that can be incorporated into the fuel pool. In one preferred embodiment, said device according to the invention may be used for pretreatment upstream of a process for hydrotreating said oils.

In the case where the device according to the invention is used upstream of a hydrotreating process, crude or semi-refined oil from pretreated renewable sources constitutes the feedstock of the hydrotreating process.

The hydrotreating of crude or semi-refined oil from renewable sources is already well known and is described in numerous patents. By way of example, the hydrotreating process then the gas/liquid separation followed by an optional hydroisomerization step may be carried out as described in patent FR 2 910 483, FR 2 950 895, FR 2 932 811, FR 2 932 812 or EP 2 403 925.

According to one preferred variant, use will be made, in the hydrotreating process, of catalysts as described in patent application FR 2 943 071 that describes catalysts having a high selectivity for hydrodeoxygenation reactions.

According to another preferred variant, use will be made, in the hydrotreating process, of catalysts as described in patent application EP 2 210 663 that describes supported or bulk catalysts comprising an active phase consisting of a group VIB sulfide, in which the group VIB element is molybdenum.

In one preferred embodiment, said device according to the invention may be used upstream of a process for transesterification of said oils so as to produce alkyl esters.

The oils are customarily treated according to a downflow mode. These oils have high fouling tendencies, in particular owing to the presence of phospholipids. The use of an upflow and of the device according to the invention, which will not be fouled by the presence of heavy compounds or viscous impurities owing to its configuration for the treatment of oils will therefore be particularly advantageous, allowing a substantial improvement in the service life of said device compared to the solutions from the prior art.

Figure 1:
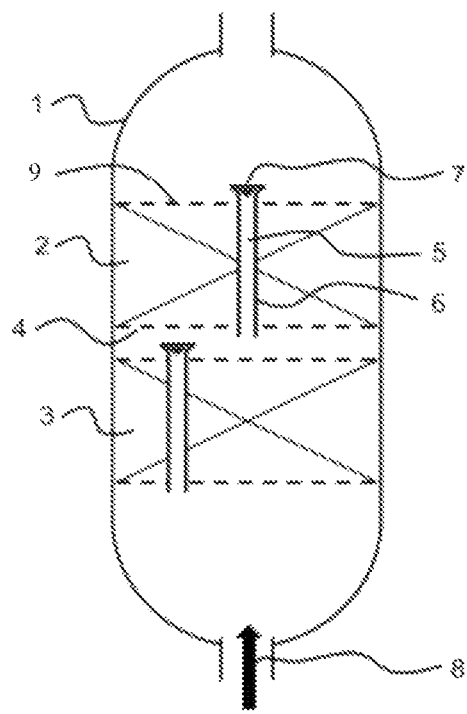
FIG. 1 presents a general schematic view of a particular arrangement of the device according to the invention. A single-phase fluid 8 flows upwards through the device 1. Said device comprises two beds of solid particles 2 and 3. For the sake of clarity, only the elements of bed 2 are numbered.

The beds are retained on their lower surface by a distribution means 4 and by a means for retaining said particles 9. Each bed comprises a bypass means 5 comprising a pipe 6 and a means for restricting the passage 7 actuated by the differential pressure across the bed.

Figure 2:
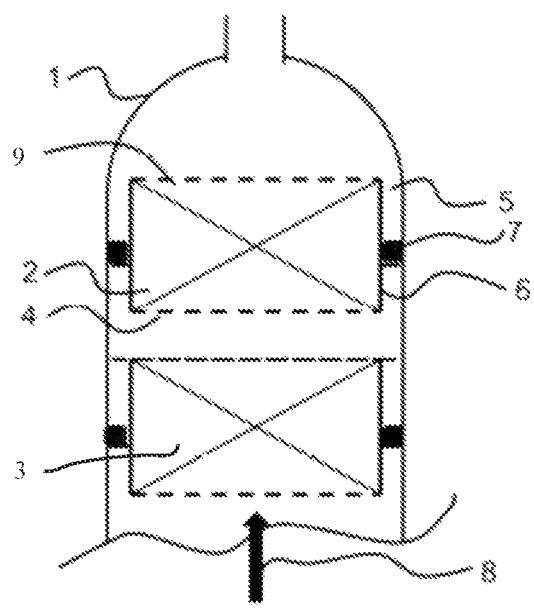

FIG. 2 presents a particular arrangement of the device according to the invention in which said bypass means is positioned at the periphery of said bed of particles. The numbering is identical to that of FIG. 1.

Figure 3:
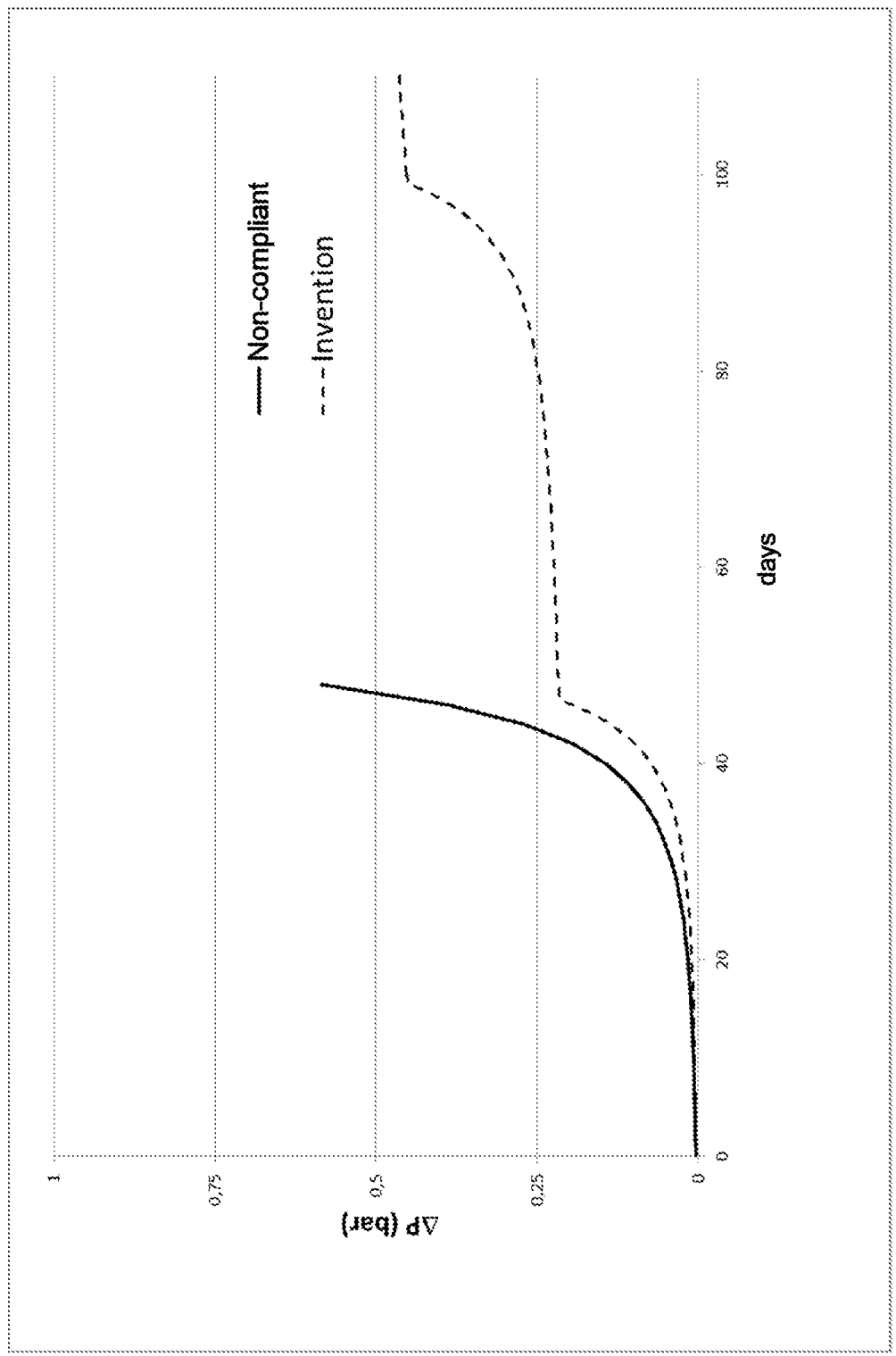

FIG. 3 is a graph showing pressure drop across the beds for the device of the invention, compared to a non-compliant device.

EXAMPLES

The example illustrates a use of the device according to the invention and according to the prior art for treating an oil containing triglycerides, free fatty acids and esters. It is illustrated by FIG. 3.

A device according to the prior art comprising a fixed bed of solid particles of alumina impregnated with calcium phosphate is passed through by a feedstock of rapeseed vegetable oil type, having a density of 875 kg.m$^{-3}$ and a viscosity of 5 cP. The liquid surface velocity through each of the beds is 7 mm.s$^{-1}$. The device has an internal diameter of 2 m, corresponding to the diameter of the fixed bed. The fixed bed has a total height of 2 m.

The differential pressure, also referred to as pressure drop, across the fixed bed increases gradually until it reaches 0.5 bar (0.05 MPa) in around 45 days. When this pressure drop is reached, it is necessary to stop the device in order to clean or replace the fixed bed.

The change over time of the pressure drop is represented as a solid line in FIG. 3.

The device according to the invention comprises two catalyst beds each with a diameter of 2 m and a height of 1 m. It is passed through in an upflow manner by one and the same oil feedstock as the device according to the prior art (rapeseed vegetable oil, having a density of 750 kg.m$^{-3}$ and a viscosity of 5 cP). The liquid surface velocity through each of the catalyst beds is 7 mm.s$^{-1}$.

Each of the beds comprises a bypass means comprising a bypass tube and a gradually opening valve was installed on a bypass tube. The diameter of the bypass tube is 0.05 m. Each valve is sized in order to open gradually starting from 0.2 bar (0.02 MPa) of pressure drop, i.e. of differential pressure, in the catalyst bed.

The two catalyst beds are separated by a height of 50 cm.

The pressure drop across the device, measured between the inlet of the first bed and the outlet of the second bed, increases gradually with time. A little after 40 days, the gradual opening of the valve of the first bed is observed when the total pressure drop reaches around 0.2 bar (0.02 MPa). The differential pressure continues to increase until the valve of the second bed also begins to open, after around a hundred days.

The limiting pressure drop of 0.5 bar (0.05 MPa) will be reached after around 110 days, thus making it possible to substantially delay the stopping of the device for the replacement or cleaning of the fixed beds, when the same total amount of solid particles has been used.

The invention claimed is:

1. A system comprising a device purifying a fouling single-phase fluid upstream of a catalytic reactor, said device comprising:
    a source of fouling single-phase fluid comprising an oil containing triglycerides and/or fatty adds and/or fatty add esters, fluidly connected to said device, which device is capable of upflow of the fouling single-phase fluid,
    at least two beds of solid particles retained on a lower surface of each bed by a distributor of said fouling single-phase fluid and on an upper surface of each bed by a retainer of said particles,
    each bed comprising at least one bypass of a portion of said fouling single-phase fluid, attached to said distributor and to said retainer,
    each bypass comprising a pipe, a lower end of which opens below a lower surface of said distributor and an upper end of which opens above said retainer,
    said pipe comprising a restrictor restricting the passage actuated by differential pressure across said bed, and
    a fluid connection of purified single-phase fluid to the catalytic reactor.

2. The device system according to claim 1, comprising at least two bypasses per bed, the restrictor restricting the passage of said bypass being actuated by different differential pressures across each of said beds.

3. The system according to claim 1, in which said restrictor comprises:
    a flared tubular portion, an orifice of which that has the smallest cross section is oriented towards the upstream of the pipe of the bypass,
    a movable part, mounted in said flared tubular portion so as to allow a displacement between a closure position and a maximum opening position, the positioning of the movable part being a function of the flow rate of fluid in said flared tubular portion, and
    a return that acts on the movable part in order to displace it towards the closure position in which the movable part blocks the orifice of the flared tubular portion that has the smallest cross section.

4. The system according to claim 1, in which said restrictor comprises:
    at least one plate movably mounted about an axis on the upper end of the pipe of the bypass so as to allow a displacement between a closure position and a maximum opening position, the positioning of said at least one plate being a function of the flow rate of fluid in the bypass, and
    a return that acts on the at least one plate in order to displace it (them) towards the closure position during which the at least one plate blocks the end of the pipe.

5. The system according to claim 1, in which a small space is made between an upper surface of at least one bed and a corresponding retainer retaining the particles.

6. A process for treating an oil containing triglycerides and/or free fatty acids and/or esters in the system according to claim 1, said process comprising:
    operating said device at a temperature of 50° C. to 320° C., at a pressure of 0.1 to 7 MPa, and with a residence time of said oil on said at least two beds of solid particles of 0.1 to 1.8 hours; wherein said solid particles are an adsorbent formed by porous refractory oxides, clays, zeolites, activated carbons, silicon carbide, or mixtures thereof.

7. The process according to claim 6, in which at least two of said device are used in parallel in said system.

8. The process according to claim 6, in which said adsorbent is a porous refractory oxide that has a macroporosity.

9. The process according to claim 6, in which said adsorbent is free of catalytic metals from groups 6 and 8 to 12.

10. The process according to claim 6, in which a process for hydrotreating said oil is conducted in said catalytic reactor, and said device is used for pretreatment of said oil upstream of said catalytic reactor.

* * * * *